3,075,469
MOTOR CONSTRUCTION
Carra L. Lane, Jr., Bettendorf, Iowa, assignor to Red Jacket Manufacturing Co., Davenport, Iowa, a corporation of Iowa
Filed Jan. 3, 1961, Ser. No. 80,189
5 Claims. (Cl. 103—87)

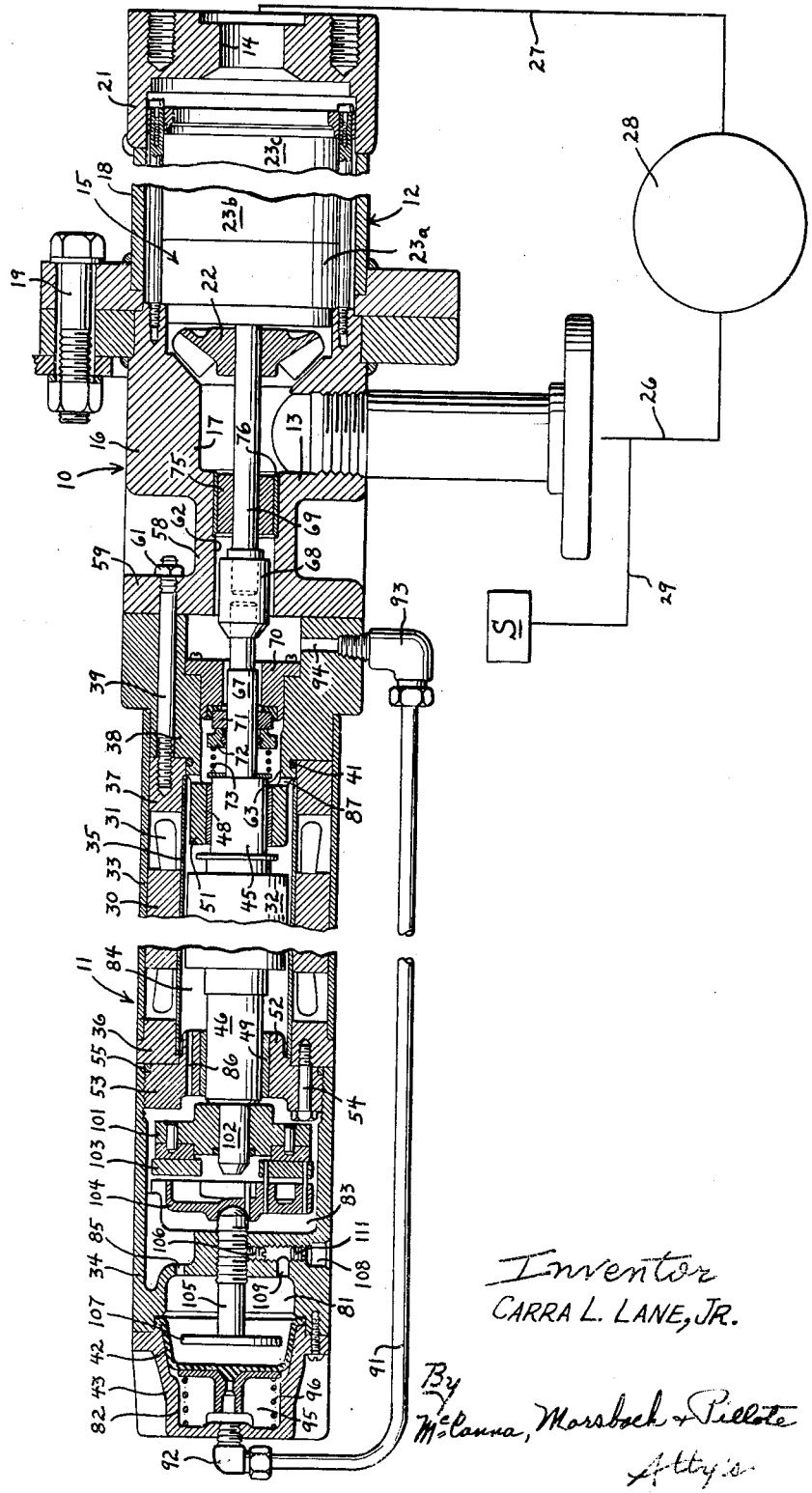

This invention relates to an improved motor for driving fluid pumps and the like.

The motor of the present invention is generally adapted for driving pump apparatus including fans, compressors and the like for pumping liquid or gaseous fluids, hereinafter collectively referred to as fluid pumps, and it is a general object of this invention to provide a motor adapted for attachment to such fluid pumps so as to form a motor-pump unit therewith which does not require any external shaft seals to seal the pump from the surrounding fluid or atmosphere.

Another object of this invention is to provide a motor, having a shaft seal on the drive end of the motor and a novel arrangement for substantially balancing the pressure on opposite sides of the shaft seal at all times.

A more particular object of this invention is to provide a motor having a rotary shaft seal for sealing the motor chamber from the fluid in contact with the external side of the shaft seal, in which the pressure at the external side of the shaft seal is transmitted through a closed passage and an imperforate isolating diaphragm to a fluid in the motor chamber to substantially balance the pressures at opposite sides of the shaft seal notwithstanding variations in pressure in the fluid at the external side of the shaft seal or thermal expansion or contraction of the fluid in the motor chamber.

A further object of this invention is to provide a motor for driving fluid pumps having a shaft seal for sealing the motor chamber from the fluid in the pump system and in which the rotor chamber is isolated from the motor windings and the fluid surrounding the motor to enable the use of a fluid in the rotor chamber which is compatible with the fluid in the pumping system to avoid contamination of the pumping system in the event of leakage of fluid from the rotor chamber past the shaft seal.

These, together with various ancillary objects and advantages of this invention will be more readily appreciated as the same becomes better understood by reference to the following detailed description when taken in connection with the accompanying drawings wherein the FIGURE is a longitudinal sectional view through the motor-pump unit shown connected to an external fluid pumping system.

The pumping apparatus includes a pump 10 and a motor 11 directly connected to the pump for driving the same. The pump 10 includes a casing 12 having a first flow passage 13 and a second flow passage 14 and pumping means designated generally by the numeral 15 in the casing for pumping fluid from one passage to the other. In the embodiment shown, the pumping apparatus is of the centrifugal type and is arranged to pump fluid from the passage 13, hereinafter sometimes referred to as the inlet passage, to the passage 14, hereinafter sometimes referred to as the outlet passage. The particular pump casing shown comprises a casting 16 having a chamber 17 formed therein and which communicates with the pump passage 13. A flanged sleeve 18 is attached to one of the castings as by fasteners 19 and has a head 21 welded or otherwise secured to the end thereof. The centrifugal pump illustrated is of the multi-stage type and includes an input impeller 22 and one or more centrifugal pump stages designated 23a—23c. The pump impellers are arranged to pump fluid from one flow passage such as 13 and discharge the same at the other flow passage 14, it being understood that the pumping apparatus could be reversed so as to pump fluid from the passage 14 and discharge the same at the passage 13, if desired. The pump passages 13 and 14 are connected to an external fluid system, as is diagrammatically shown in the FIGURE. For example, the pump may be used as a boiler feed water recirculation pump, in which case the input and discharge passages 13 and 14 are respectively connected through conduits 26 and 27 to a boiler 28. As is conventional, replenishing water is fed under pressure into the boiler feed water system for an external source designated S through a conduit 29.

The motor 11 includes a stator core 30 having windings 31 which extend through slots in the stator core, and a rotor 32 disposed within the stator. In accordance with the present invention, the motor is constructed to form a sealed rotor chamber therein which is isolated from the fluid surrounding the motor and, advantageously, the sealed chamber is formed inside the stator and windings so that the windings are separated from contact with the fluid in the rotor chamber. In the embodiment illustrated, the motor casing includes a sleeve 33 which surrounds the stator and a housing 34 which extends from one end of the sleeve. An imperforate liner 35 of a suitable non-magnetic material extends through the stator bore and is connected to the sleeve 33 by end ring members 36 and 37. The sleeve 33 may be made imperforate and sealed to the end ring members if it is desired to seal the stator and windings from the fluid surrounding the motor or, alternatively, the sleeve may be of open construction to allow the surrounding air to pass around the windings. An end bell 38 is attached to one end of the motor casing as by fasteners 39 and is sealed to the end ring 37 as by an O-ring 41 to form a closure for one end of the rotor chamber. An imperforate isolating diaphragm 42 formed of a resilient material such as rubber is clamped to the end of the housing 34 by a cap 43 to close the other end of the rotor chamber and isolate the same from the surrounding fluid.

The rotor 32 has trunnions 45 and 46 at opposite ends thereof which are rotatably supported in bearings 48 and 49 in the rotor chamber. The bearing 48 is mounted in a bearing support 51 conveniently attached to the end bell 38 and the bearing 49 is carried by a support 52 on an end bell 53. As shown, the end bell 53 is secured to the end ring 36 by fasteners 54 and is sealed thereto by an O-ring 55.

One end of the motor casing is detachably secured to the pump casing 12 and, as shown, the pump casting 16 has a tubular extension 58 formed with a flange 59 at one end which is clamped, as by nuts 61 on the fasteners 39 to the end bell 38. The tubular extension 58 defines a passage 62 which communicates at one end with the pump chamber 17 and the pump flow passage 13, and at the other end with a shaft seal chamber 63 formed in the end bell 38. A motor shaft 67 is connected to the rotor 45 and extends through the seal chamber 63 and into the passage 62. The motor shaft 67 is detachably connected through a coupling 68 with the pump shaft 69, and the latter extends through the chamber 17 and is connected to the pump impellers 22 and 23. A shaft seal is disposed around the shaft 67 to prevent the passage of pump fluid into the rotor chamber, and, as shown, the shaft seal includes a stationary seal member 71 attached to the end bell 38 on the motor casing by a retaining member 70 and having a seal face on the end thereof adjacent the motor casing, and a rotary seal member 72 carried by the shaft at the motor casing side of the stationary seal member. The rotary seal member is yieldably urged against the stationary seal face by a spring 73. A guide bushing 75 is preferably mounted on the pump casing 16 in a retainer 76 to rotatably support the pump shaft and to also limit recirculation of the pump fluid through the passage 62 to the shaft seal.

In some applications, the pressure at the external side of the shaft seal differs substantially from the pressure on the fluid surrounding the motor. For example, in the closed boiler recirculation system illustrated, the inlet pressure of the pump must be maintained sufficiently above atmospheric pressure to prevent vaporizing of the heated liquid. In such applications, or in any other pump applications wherein the pump inlet pressure differs from atmospheric pressure, or, alternatively, in those applications wherein the pump is operated so that the discharge pressure is applied to the shaft seal, it has heretofore been necessary to provide a high pressure type shaft seal in order to effectively prevent the pump liquid from flowing into the motor chamber. In accordance with the present invention, provision is made for applying fluid pressure to the motor casing side of the shaft seal to substantially counterbalance the pressure acting on the external side thereof and thereby enable the use of a low-pressure type shaft seal and to also minimize the pressure gradient across the seal faces and the tendency of the seal to leak. For this purpose, the rotor chamber is filled with a liquid and means is provided for pressurizing the liquid in the motor casing in accordance with the pressure existing at the pump side of the shaft seal. As shown, the pressure applying wall or diaphragm 42 defines a liquid storage reservoir 81 at one side thereof and a pressure applying compartment 82 at the other side. One side of the diaphragm 89 is exposed to the fluid in the reservoir 82 and the other side of the diaphragm is sealed from communication with the fluid surrounding the motor by the cap 43. The reservoir 81, the compartment 83 in the housing 34, and the compartment 84 inside the liner 35 are interconnected by passages 85 and 86, in the housing 34 and end bell 53 respectively, so that the pressure in the reservoir 81 is transmitted to the rotor chamber. In addition, the rotor chamber is connected with the seal compartment 63, as by passages 87 formed in the rotor bearing support 51. Thus, the fluid pressure in the reservoir 81 is applied directly to the inner side of the rotary seal member 72. A closed passage means, herein shown in the form of a conduit 91, is connected by a fitting 92 to the pressure applying chamber 82 in the cap 43. The other end of the conduit 91 is connected, as by a fitting 93 and passage 94 to the external side of the shaft seal so as to apply the fluid pressure thereat to the diaphragm 42. In this manner the fluid pressure existing at the external or pump side of the shaft seal is applied through conduit 91, diaphragm 42 and through the fluid in the rotor chamber to the inner side of the shaft seal so as to maintain the pressure thereat at least equal to the pressure at the external side of the shaft seal. Since the fluid being pumped is frequently of a character or at a temperature which would adversely effect the motor, and cause mechanical or electrical failure of the motor, it is preferable to maintain the pressure in the motor chamber slightly above the pressure at the external side of the shaft seal. For this purpose, a follower 95 is disposed in the cap 43 and engages the diaphragm 42, and a light spring 96 is interposed between the cap and the follower to apply a preselected relatively low pressure to the diaphragm which supplements the fluid pressure applied thereto through the conduit 91.

The sealed rotor chamber thus encloses the main rotor bearings 48 and 49. A motor thrust bearing may also be enclosed in the sealed rotor chamber. As shown, the thrust bearing includes a rotary member 101 attached to an extension 102 on the rotor and a stationary member 103 adjustably supported by a member 104 on an adjusting screw 105. The thrust bearing adjusting screw is locked in adjusted position as by a set screw 106 and the adjusting screw conveniently has an enlarged head 107 for limiting distention of the diaphragm 42. The motor is filled with liquid through passages 108 and 109 and the passages thereafter sealed by a plug 111 to maintain the fluid in rotor chamber isolated from the surrounding fluid.

In use, the closed pressure applying passage including the conduit 91 and the isolating diaphragm 42 accurately maintains the pressure at the motor side of the shaft seal at least equal to the pressure at the external side of the shaft seal so that the pressures at opposite sides of the shaft seal are substantially balanced at all times. This enables the use of an inexpensive low pressure mechanical shaft seal while effectively preventing the fluid at the external side of the shaft seal from entering the rotor chamber. This is of particular importance where the fluid at the external side of the shaft seal, for any reason such as high temperature; corrosion characteristics; lack of adequate lubricity and the like would adversely affect the motor if it entered the same. On the other hand, it is freqeuntly of equal importance to prevent contamination of the fluid in the pumping system, due to the passage of fluid from the motor into the pump system. The substantial balancing of the pressures on the shaft seal effectively minimizes leakage therepast. However, in order to avoid the possibility of contamination of the fluid in the pump system, it is preferable to select the fluid for filling the motor so that the fluid is compatible with the fluid being pumped and will not produce any undesirable reaction if mixed with the pumped fluid or if it enters the pump system. Since the motor windings are sealed from the rotor chamber by the liner 35, it is not necessary that the motor fill liquid have good electrical insulating characteristics. This allows somewhat greater range in selecting a motor fill liquid which is compatible with the pump liquid and which yet has the other desirable characteristics for motor operation such as good lubrication characteristic; good thermal stability; low viscosity and the like.

I claim:

1. A pumping apparatus comprising, a pump including a pump casing having a pump inlet passage; a pump discharge passage; a shaft opening communicating with one of said pump passages and extending to one end of the pump casing; and impeller means for pumping fluid from the pump inlet passage to the pump discharge passage, a motor unit having a stator; a rotor; and motor casing means including motor housings at opposite ends of the stator defining a chamber around the rotor, one of said motor housings having a shaft opening communicating with said chamber and extending to one end of the motor, means attaching said one of said motor housings to said pump casing with the shaft opening in the motor housing communicating with the shaft opening in the pump casing to form an enclosed shaft passageway extending from the chamber in the motor to said one of the pump passages in the pump casing, a shaft connected to said rotor and extending through said enclosed shaft passageway to said impeller means for driving the same, a shaft seal intermediate the ends of said shaft passageway forming a running seal around the shaft between the chamber in the motor and said one of said pump passages and having one side exposed to fluid pressure in said chamber and the other side exposed to fluid pressure in said one of said pump passages, a liquid completely filling said chamber, said motor casing means having a pressure transmitting movable wall therein with one side exposed to fluid pressure in said chamber, means sealing the other side of the movable wall from the fluid surrounding the motor casing, and pressure applying passage means communicating with said other side of said movable wall and with said one of said pump passages to apply the pressure at the pump side of the shaft seal to the movable wall for pressurizing the liquid at the chamber side of the shaft seal and thereby maintain approximate pressure balance at opposite sides of the shaft seal.

2. A pumping apparatus comprising, a pump including a pump casing having a pump inlet passage; a pump discharge passage; a shaft passage communicating with one of said pump passages and extending to one end of the pump casing; and impeller means for pumping fluid from the pump inlet passage to the pump discharge passage, a motor unit having a stator; a rotor; and motor casing means including motor housings at opposite ends of the stator defining a chamber around the rotor, one of said motor housings having a shaft passage communicating with said chamber and extending to one end of the motor, means attaching said one of said motor housings to said pump casing with the shaft passage in the pump casing communicating with the shaft passage in the motor housing to form an enclosed shaft passageway extending from the chamber in the motor to said one of the pump passages in the pump casing, a shaft connected to said rotor and extending through said enclosed shaft passageway to said impeller means for driving the same, a shaft seal in said shaft passageway forming a running seal around the shaft between the chamber in the motor and said one of said pump passages and having one side exposed to fluid pressure in said chamber and the other side exposed to fluid pressure in said one of said pump passages, said shaft seal being located in the shaft passage in said motor housing, a liquid completely filling said chamber, said motor casing means having a pressure transmitting movable wall therein with one side exposed to fluid pressure in said chamber, means sealing the other side of the movable wall from the fluid surrounding the motor casing, and pressure applying passage means having one end connected to said one motor housing and communicating with said shaft passageway at the side of the shaft seal adjacent the pump, said pressure applying passage means having the other end thereof communicating with said other side of said movable wall to apply pressure at the pump side of the shaft seal to the movable wall for pressurizing the liquid in the chamber side of the shaft seal and thereby maintain approximate pressure balance at opposite sides of the shaft seal.

3. The combination of claim 2 including a bushing in said shaft passage in said pump casing around said shaft for limiting circulation from said one of said pump passages through said shaft passageway to said shaft seal.

4. The combination of claim 2 wherein said shaft seal includes a stationary seal member having a seal face on said one motor housing, and a rotary seal member on the shaft at the side of the stationary seal member adjacent said motor casing, and spring means engageable with said pressure transmitting movable wall for supplementing the pressure applied thereto from said one of said pump passages to thereby maintain the pressure at the motor casing side of the shaft seal slightly greater than the pressure at the other side of the shaft seal.

5. The combination of claim 2 wherein said pressure transmitting movable wall is located at the other motor housing at the end of the motor casing means remote from the pump means and said pressure applying passage means includes a conduit located externally of said motor casing.

References Cited in the file of this patent

UNITED STATES PATENTS

| | | |
|---|---|---|
| 2,423,436 | Blom | July 8, 1947 |
| 2,682,229 | Luenberger | June 29, 1954 |
| 2,739,252 | Patterson et al. | Mar. 20, 1956 |